United States Patent Office 3,245,914
Patented Apr. 12, 1966

3,245,914
GERMICIDAL ALKYLHALODIPHENYL OXIDE SULFONATE COMPOSITIONS
Alfred F. Steinhauer and Joseph C. Valenta, Midland, Mich., assignors to The Dow Chemical Company, Midland, Mich., a corporation of Delaware
No Drawing. Original application Sept. 28, 1959, Ser. No. 842,583. Divided and this application June 20, 1963, Ser. No. 289,395
6 Claims. (Cl. 252—106)

This application is a division of our copending application, Serial No. 842,583, filed September 28, 1959, now Patent No. 3,110,683, which in turn is a continuation-in-part of applications, Serial No. 744,008, filed June 23, 1958, now Patent No. 2,992,999, Serial Nos. 735,669 and 735,681, filed May 16, 1958, now abandoned and Serial No. 816,061, filed May 27, 1959, now abandoned.

This invention relates to alkylated halogenated sulfonated diphenyl oxides; i.e., to compounds having diphenyl oxide as a nucleus to which are attached a long-chain alkyl radical, one or two halogens, and one or two sulfonic acid radicals. These compounds are those having the generic formula

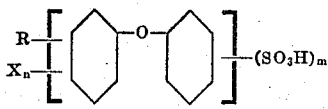

wherein R represents an alkyl radical containing 12 to 22 carbon atoms; X represents a halogen of atomic number 17 to 53, i.e., chlorine, bromine or iodine; and, $m$ and $n$ are integers from 1 to 2; and, salts thereof.

The soluble compounds of the invention are highly surface-active. Thus, the lithium, sodium, potassium, ammonium and most amine salts are readily soluble in water and are useful as detergents, wetting agents, emulsifying and dispersing agents and the like. Many are soluble in petroleum oils and distillates and in various organic fluids. The polyvalent metal salts are substantially insoluble in water but are generally soluble in various organic solvents, including petroleum oils. Solutions in the latter are particularly useful as corrosion inhibitors for ferrous metals as well as being effective oil-soluble surfactants.

The compounds of the invention may be prepared in a variety of ways. Thus, diphenyl oxide may be alkylated, halogenated and sulfonated in any desired sequence to produce the sulfonic acids. The latter may then be converted to any desired salt thereof by reaction with the appropriate base or salt. Alternatively, either or both of the benzene rings of the diphenyl oxide nucleus may be appropriately alkylated and/or halogenated before being condensed to form the diphenyl oxide nucleus. Some of these methods are illustrated by the following examples.

EXAMPLE 1.—DODECYLDICHLORODIPHENYL OXIDE SULFONATE

Step (1) Preparation of dichlorodiphenyl oxide.—Chlorine was sparged into diphenyl oxide containing 1% by weight of ferric chloride, the temperature being maintained at about 40° C., until the increase in weight corresponded to the dichloro ether. The product was then degassed, washed, dried and distilled.

Step (2) Alkylation of dichlorodiphenyl oxide.—To 359 grams of dichlorodiphenyl oxide obtained from Step (1) containing 13.85 grams of anhydrous aluminum chloride there was added dropwise with stirring 168 grams of tetrapropylene, the temperature being maintained at 60-63° C. Stirring was continued for one hour after the addition was complete, after which the reaction mixture was cooled, washed with water and distilled at 0.8 mm. pressure.

Step (3) Sulfonation of alkyldichlorodiphenyl oxide.—One tenth mole of dodecyldichlorodiphenyl oxide obtained from Step (2) was dissolved in 200 ml. of methylene chloride. The solution was maintained at 9°–17° C. while a solution of 10.4 grams of sulfur trioxide in 75 ml. of methylene chloride was slowly added with stirring. Fifteen minutes after the addition was complete, 350 ml. of water was added with stirring and the mixture was then neutralized with 50% aqueous sodium hydroxide. The aqueous and organic layers were separated and the latter was dried and the solvent evaporated, thus leaving a solid which was then ground to a tan powder. It was readily soluble in water and ethanol.

Various homologs and analogs of the above product were prepared by substantially the same procedure. Thus, when the tetrapropylene used in Step (2) above was replaced with an equivalent amount of higher olefins containing up to 22 carbon atoms, the corresponding alkyldichlorodiphenyl oxide sulfonates were obtained. They had properties generally similar to those of the dodecyl homolog but were more readily soluble in organic solvents, especially in hydrophobic solvents. When primary-alkyl-substituted products were desired the diphenyl oxide or halogenated diphenyl oxide was alkylated by using the alkanoyl chloride (e.g., lauroyl chloride) and aluminum chloride and then hydrogenating the thus formed acyl diphenyl oxide to the corresponding alkyl derivative.

In another manner of preparing the compounds of the present invention, a halobenzene compound which may contain one to three halogen substitutents is mixed or otherwise blended with a phenol (by the term phenol, it is to be understood that this term is inclusive of phenol and halophenol) in the presence of a catalytic amount of copper and/or mercury and a strong alkali and preferably in the presence of an inert organic solvent. The reaction proceeds smoothly at about the reflux temperature of the mixture with the production of the desired product and water of reaction. The water of reaction is azeotropically removed from the reaction zone as formed. Upon near completion of the reaction, as evidenced by the substantial cessation of the formation of water of reaction, the temperature of the reaction mixture is raised to about 150°–160° C. for a period of time to complete the reaction. The mixture is thereafter cooled to about 90° C., filtered while hot, water added and permitted to stand, whereupon aqueous and organic layers form. The desired product is obtained from the organic layer and is employed in the preparation of the alkylhalodiphenyl oxide by alkylation with an olefin in the presence of anhydrous aluminum chloride. The reaction mixture upon completion of the latter reaction mixture separates into 2 layers, i.e., organic and aqueous. The desired product is again removed from the organic layer and employed in the sulfonation step to prepare the alkylhalodiphenyl oxide sulfonate. The sulfonation may be carried out employing sulfur trioxide or oleum and is preferably carried out by employing sulfur trioxide in an inert solvent, such as methylene chloride or perchloroethylene.

EXAMPLE 2.—SODIUM 4-CHLORO-4'-DODECYL-DIPHENYL OXIDE SULFONATE

Step (1) Preparation of 4-chlorodiphenyl oxide.—1700 grams (8.9 moles) of 1-bromo-4-chlorobenzene was mixed with 740 grams (7.85 moles) of phenol and one-half gram of mercury, and dispersed in 150 ml. of toluene containing 10 grams of copper bronze powder. The resulting mixture was heated to the reflux temperature (130° C.) and 380 grams of potassium hydroxide added slowly. The water of reaction was azeotropically distilled and removed from the reaction zone. When most of the water of reaction had been removed the major portion of the benzene remaining was also removed and the temperature of the reaction mixture was raised to 150° C. for 2 hours and then to 160° C. for 1 hour. Thereafter, the mixture was cooled to about 90° C. and water added to dissolve the salts which had formed. Filter-aid was added, the mixture was filtered hot and the filtrate permitted to separate into a water layer and an organic layer. The water layer was separated and washed with ethylene dichloride and the extract added to the organic layer. The organic layer was fractionally distilled under reduced pressure to obtain a 4-chlorodiphenyl oxide product boiling at 133°–139° C. at 5 mm. pressure.

*Step (2) Preparation of 4-chloro-4'-dodecyldiphenyl oxide.*—76.6 grams (0.375 mole) of 4-chlorodiphenyl oxide prepared in the manner of Step (1) and 3.6 grams of anhydrous aluminum chloride were mixed together and heated to 60° C. While maintaining this temperature, 42.0 grams (0.25 mole) of tetrapropylene were added slowly, portionwise, over a one-hour period. Upon completion of the addition, the reaction mixture was heated for an additional hour with stirring. Thereafter, the reaction mixture was diluted with an equal volume of water and, upon standing, the reaction mixture separated into two layers. The aqueous layer was separated and discarded; the organic layer washed with a 10% aqueous solution of $NaHCO_3$, then with water-methylene chloride solution, and subsequently dried over $CaCl_2$. The resulting product was fractionally distilled under reduced pressure to obtain a 4-chloro-4'-dodecyldiphenyl oxide product having a boiling range of 190°–235° C. at 5 mm. pressure.

*Step (3) Preparation of 4-chloro-4'-dodecyldiphenyl oxide sodium sulfonate.*—5.2 grams (0.065 mole) of $SO_3$ dissolved in 50 ml. of methylene chloride were added with stirring over a 15-minute period to 18.65 grams (0.05 mole) of the product of Step (2) dissolved in 100 ml. of methylene chloride. The temperature was maintained at 23° C. throughout the addition by external cooling of the reaction vessel in an ice-water bath. The stirring was continued for an additional 15 minutes, after which 150 ml. of water was added and the reaction mixture neutralized to pH 7.0 by adding sodium hydroxide. The entire mixture was oven-dried at 100° C. and thereafter extracted with 1 liter of absolute ethyl alcohol and the alcohol evaporated from the extract to obtain a sodium 4-chloro-4'-dodecyldiphenyl oxide sulfonate product as an off-white solid having a softening range of 120°–135° C.

EXAMPLE 3.—PREPARATION OF COMMERCIAL SODIUM 4 - CHLORO - 4' - DODECYLDIPHENYL OXIDE SULFONATE

*Step (1) Preparation of 4-chlorodiphenyl oxide.*—680 grams (4 moles) of diphenyl oxide and 7 grams of fine steel wool were placed in a reaction vessel which was provided with an external cooling means. The entire reaction vessel and cooling bath were covered to exclude light. Chlorine gas was bubbled through the reaction mixture until the specific gravity reached 1.18. During the addition of the chlorine gas, the reaction mixture was maintained at a temperature of about 40° C. Subsequently, air was blown through the reaction mixture to remove the excess chlorine and HCl. The crude product was washed with 10% sodium bicarbonate solution and then with water. It was then diluted with an equal volume of methylene chloride, dried over calcium chloride, filtered and distilled under reduced pressure. As a result of these operations there was obtained 265 grams of product boiling at 136° C. ± 3° C. at 5 mm. pressure. The product consisted of a mixture of 12% of 2-chlorodiphenyl oxide and 88% of 4-chlorodiphenyl oxide.

*Step (2) Preparation of 4-chloro-4'-dodecyldiphenyl oxide.*—Employing the reaction product of Step (1) above in the manner of Step (2) of Example 2 to alkylate the product there is obtained a 4-chloro-4'-dodecyldiphenyl oxide product (containing 12% 2-chloro derivatives) boiling at 184°–188° C. at 1.1–1.6 mm. pressures.

*Step (3) Preparation of sodium 4-chloro-4'-dodecyldiphenyl oxide sulfonate.*—Employing the procedure of Step (3) of Example 2, the product of Step (2) above was sulfonated to obtain a sodium 4-chloro-4'-dodecyldiphenyl oxide sulfonate product (containing 12% 2-chloro derivative) as a light tan crystal having a softening point of 120°–135° C.

In the manner of the Example 3, employing appropriate starting materials, sodium pentadecylchlorodiphenyl oxide sulfonate was obtained as a paste having a softening point of 56–60° C.

EXAMPLE 4.—SULFONATION OF THE ALKYLATED CHLORODIPHENYL OXIDE WITH 20 PERCENT OLEUM

One-tenth mole of 4-chloro-4'-dodecyldiphenyl oxide (88% 4-chloro and 12% 2-chloro isomer) and 100 ml. of methylene chloride were placed in a cooled reaction zone with a stirrer; 50 grams of 20% oleum was slowly added portionwise over a period of 15 minutes with stirring and at a temperature of 18°–25° C. Stirring was continued for an additional 15 minutes. Thereafter the reaction mixture was permitted to settle and formed an organic layer above the unused acid which later was removed. The organic layer was dropped into 150 milliliters of water and neutralized with 30 percent aqueous caustic to a pH 7.0–7.5. The mixture was permitted to settle and the organic lower layer recovered and dried. The sodium 4-chloro-4'-dodecyldiphenyl oxide sulfonate product (containing 12% of the 2-chloro isomer) was an off-white color and had a softening point of 104°–107° C.

In the manner of Example 3, employing the appropriate starting compounds, other haloalkyldiphenyl oxide sulfonate salts may be prepared as for example, the sulfonates of docosylchlorodiphenyl oxide, eicosylchlorodiphenyl oxide, dodecylbromodiphenyl oxide, tetradecylbromodiphenyl oxide, dodecyliododiphenyl oxide, and the like.

EXAMPLE 5.—SODIUM 4-CHLORO-4'-DODECYLDIPHENYL OXIDE DISULFONATE

*Step (1) Preparation of 4-chlorodiphenyl oxide.*—2375 pounds of diphenyl oxide and 22.7 pounds of anhydrous ferric chloride were placed in a reaction vessel which was provided with an external cooling means. The entire reaction vessel and cooling bath were covered to exclude light. Chlorine gas was bubbled through the reaction mixture until the specific gravity reached 1.203. During the addition of chlorine gas the reaction mixture was continuously stirred and the reaction temperature was maintained at about 40° C. Subsequently air was blown through the reaction mixture to remove the excess chlorine and HCl. The crude product was washed with 13 pounds of sodium carbonate as an aqueous solution and then with water. It was then diluted with an equal volume of methylene chloride, dried over calcium chloride, filtered, and the solvent distilled to obtain 2768 pounds of crude product. 82 pounds of this crude product was distilled under reduced pressure to obtain 45.3 pounds of product boiling at 124–134° C. at 3.3 mm. pressure. The product consisted of a mixture of 17% of 2-chlorodiphenyl oxide and 83% of 4-chlorodiphenyl oxide.

*Step (2) Preparation of 4-chloro-4'-dodecyldiphenyl oxide.*—511 grams of chlorodiphenyl oxide prepared in the manner of Step (1) and 22.3 grams of anhydrous aluminum chloride were mixed together and dry hydrogen chloride bubbled into the mixture for 5 minutes. Thereafter the reaction vessel and contents were heated to 60° C. While maintaining this temperature, 280 grams of tetrapropylene were added slowly, portionwise, over a one-hour period. Upon completion of the addition, the reaction mixture was heated for an additional 2 hours with stirring. Thereafter, the reaction mixture was agitated with an equal volume of 30% sodium hydroxide solution. Upon standing, the reaction mixture separated into two layers. The aqueous layer was separated and discarded while the organic layer was washed with a 10% aqueous solution of NaHCO$_3$ and then with water-methylene chloride solution and subsequently dried over CaCl$_2$. After distillation of the solvent the resulting crude product (778 grams) was fractionally distilled under reduced pressure to obtain a 4-chloro-4'-dodecyldiphenyl oxide product (17% ortho-chloro and 83% para-chloro) having a boiling range of 170°–180° C. at 1.5 mm. pressure.

In the manner of the Step (2) employing the appropriate starting materials, the following compounds were obtained having the following properties.

*Alkylhalodiphenyl oxides*

Boiling temperatures
Pentadecylchlorodiphenyl oxide _ 182–210° C. at .4–.9 mm.
Dodecylbromodiphenyl oxide ___ 200–240° C. at 5 mm.

*Step (3) Disodium dodecylchlorodiphenyl oxide disulfonate.*—37.3 grams of dodecylchlorodiphenyl oxide was dissolved in 500 grams of methylene chloride and then cooled in an ice bath to below 27° C. There was added a solution of 20 grams of sulfur trioxide in 266 grams of methylene chloride with stirring over a period of 15 minutes. After the addition was complete, the reaction mixture was stirred for one-half hour. Thereafter, one-half liter of water was added and the mixture was neutralized with 50% sodium hydroxide. The methylene chloride layer which formed was separated and discarded. The remaining aqueous solution was dried in an oven to obtain a sodium dodecylchlorodiphenyl oxide sulfonate product as a light yellow powder which was found to give a clear solution at concentration of 0.1% and 5% in 7% sodium hydroxide solution and was found to be insoluble in 17% sodium hydroxide solution at either concentration. The 5% solution in 7% sodium hydroxide had a surface tension of 30.3 dynes/cm. The powder had a softening point of above 300° C.

EXAMPLE 6.—SODIUM PENTADECYLCHLORODIPHENYL OXIDE DISULFONATE 22.2 grams (.054 mole) of pentadecylchlorodiphenyl oxide of Step (2) of Example 5 was dissolved in 107 ml. of methylene chloride. To this solution there was added 12.86 grams (.161 mole) of sulfur trioxide dissolved in 64 ml. of methylene chloride over a period of 11 minutes with stirring and cooling. It was stirred for an additional 56 minutes. The temperature was maintained at 10–20° C. during the reaction. The reaction mixture was worked up as above to give a light brownish powder which was soluble at 5% concentration in 7% sodium hydroxide and insoluble in 17% sodium hydroxide. The 5% solution had a surface tension of 32.2 dynes/cm.

EXAMPLE 7

Employing dodecylbromodiphenyl oxide of Step (2), Example 5 and the procedure of Step (3) of Example 5, there was obtained a sodium dodecylbromodiphenyl oxide disulfonate having a softening point of 270°–280° C.

By a similar procedure but by use of only half as much sulfur trioxide, sodium dodecylbromodiphenyl oxide sulfonate was prepared. A 0.1% solution of it in water had a surface tension of 32.2 dynes/cm. and an interfacial tension against mineral oil of 1.8 dynes/cm.

It is readily apparent that in the synthesis of the compounds of the invention one may, and usually does, obtain a mixture of cogeneric products wherein the number of alkyl, halogen or sulfonate substituents on the diphenyl oxide nucleus has an average value other than the whole numbers 1 or 2. Thus, a typical product may contain an average of 1.1 alkyl groups, 1.8 halogen atoms and 1.4 sulfonate groups. Such mixtures are in general fully as useful as the pure compounds and are sometimes actually preferred to the latter.

It is likewise apparent that one can make any desired salt from the sulfonic acids of the invention. The acids may be neutralized directly with ammonia, an amine or a soluble metal hydroxide or carbonate. Alternatively, one may convert one salt to another. Thus, to make the magnesium or iron salt, for instance, one may add an aqueous solution of a soluble iron or magnesium salt, such as the chloride or nitrate, to an aqueous solution of an alkali metal or ammonium salt of the sulfonic acid. The magnesium and iron salts of the sulfonic acid, being substantially insoluble in water, are thus precipitated.

The water soluble salts of the invention, i.e., the alkali metal, ammonium and lower alkylamine salts, are highly effective surfactants and are useful as the active ingredient of detergents, wetting and dispersing agents, emulsifiers, and the like. Specific applications include dish-washing and laundry detergents, toilet soap bars, shampoos, dry cleaning detergents, sanitizing detergents for scrubbing floors, dairy equipment, veterinary hospital rooms, pens and equipment, and the like. They are also highly effective as dry cleaning detergents.

The dry cleaning industry employs a variety of water-insoluble solvents for cleaning soiled fabrics. These include perchloroethylene, trichloroethylene, carbon tetrachloride, Stoddard solvent, etc. It is common practice to add to these dry cleaning fluids various surface-active agents to remove water-soluble stains from the materials being cleaned. In the early days of detergent use it was found that the addition of some water to the solvent mixture was necessary in order for the detergent to function properly and for water-soluble soils such as salt, sugars and perspiration to be removed. Any water-soluble salt or stain not removed during dry cleaning treatment was later removed by a time-consuming and expensive method known as "spotting." It was also found that the addition of too much water would cause shrinkage and wrinkling or have other detrimental effects upon the fabric. Since that time the dry cleaning industry has had the problem of finding means and solvent compositions which would maintain the water concentration in the solvent within the limits required for efficiency of the detergent without adverse effects upon the fabric.

It has been discovered that if an alkali metal, amine or ammonium salt of an alkylated halogenated diaryl oxide sulfonic acid is added to substantially water-insoluble dry cleaning fluid, a solvent composition is produced which shows outstanding and unusual properties, both as concerns cleaning effectiveness and as concerns control of effective water concentration in the solvent. The dihalomonosulfonates are especially suitable for this purpose. In the commercial dry cleaning practice it was found that the relative vapor pressure of water ($P/Po$ where $P$ and $Po$ are, respectively, the partial pressure of water vapor in equilibrium with the composition and with pure water) in the dry cleaning solvent containing a soap or detergent was an important factor in determining the acceptability of the solvent and this value became known as "solvent relative humidity." A study of this problem is to be found in ASTM Bulletin for September of 1953 on pages 65–68 (TP 153 et seq.). It was established that if the solvent relative humidity was less than 0.65 the soap or detergent would not function properly in the removal of water-soluble soils and stains in the material. If the solvent relative humidity was greater than 0.80 the fabric would be subject to wrinkling or shrinkage due to the presence of excessive water. A range of from about 0.70 to 0.75 is the preferred range. As soiled materials are added to the dry cleaning system, the water content, and consequently the solvent relative humidity, of the system increases because of the water carried by the fabric.

The rate of increase of solvent relative humidity with increasing water content is dependent upon the particular soap or detergent employed with the solvent and upon its concentration. It is obviously desirable that a solvent-detergent composition be employed wherein the rate of increase of solvent relative humidity with increasing water concentration be as low as possible. The solvent relative humidity for a system containing any given amount of soap or detergent, however, cannot be predicted in advance by any method currently known.

It is surprising, therefore, to find that the use of an alkylated halogenated diphenyl oxide sulfonate salt with any of the known dry cleaning solvents produces a solvent-detergent mixture with an ability to allow the addition of greatly increased quantities of water and still remain within the desired solvent relative humidity range. In addition to this advantage, a combination of dry cleaning solvent with a haloalkyldiphenyl oxide sulfonate salt shows an improved ability to remove water-soluble soils. To the dry cleaning industry this means a reduction of spotting and a greatly simplified dry cleaning procedure. The dry cleaning solvent, in order to obtain a dry cleaning composition having the highly desirable characteristics, should contain about 0.25 to 20%, and preferably about 3 to 6%, by weight, of the alkylated halogenated diphenyl oxide sulfonate salt.

In order to obtain solvent relative humidity values for the compositions of this invention and to have a standard method for comparison of these values with those obtainable with known solvent-detergent systems, standard ASTM equipment and procedures were employed. The steps of this procedure and equipment employed are described in more detail in ASTM Bulletin (PB 153) for September, 1953 on pages 64–67. The procedure followed was to place 500 cc. of dry cleaning solvent containing 20 grams of the detergent to be tested into a 1000 cc. flask. The flask was placed in a constant-temperature oven at 80° F. and stirred with a hollow impeller connected to a hollow shaft. As the impeller was rotated, air was forced through the solvent, past a humidity-sensing element which was connected to a recorder and back through the hollow shaft and impeller into the solvent. The stirring was continued until the recorder indicated that equilibrium had been reached. At this time about 0.5 gram of water was added to the system and stirring was continued until equilibrium was again reached. This process was continued until a solvent relative humidity of about 90 had been obtained. The results of several such experiments are shown in the table below, wherein the relative humidity of the solvents at various water contents is shown. From these data it is evident that the detergents of the present invention tolerate a much higher water content in the dry cleaning fluid without exceeding the desirable humidity range than do the detergents currently used in the industry.

ers are confronted with two widely dissimilar types of "soil" to be removed from fabrics: (1) water-soluble soils, typified by perspiration stains and (2) water-insoluble soils typified by dirt, greases, and the like. Since many detergents which are highly effective in removal of one type are ineffective with the other, and since it is highly desirable that a detergent be effective with both, tests were set up to measure the effectiveness of our compounds with both types of soil. These tests and the results thereof were as follows:

Water soluble removal test (1) A 4-inch wide strip of rayon white crepe, approximately 30 yards long, is passed through a 1.5 N NaCl solution, a clothes wringer, over a bank of drying lamps, and then wound onto a take-up reel.

(2) Swatches are cut from the roll at 4-inch intervals and numbered consecutively.

(3) Every 20th swatch is set aside for a salt content determination. These are the blanks.

(4) Determination of the salt content of swatches is as follows: A blank swatch is weighed, placed in a 250 ml. Erlenmeyer flask and 75 to 100 ml. of deionized water is added. Fluorescein indicator is added and the contents titrated with .1 N $AgNo_3$. The presence of the swatch does not interfere with the end point. The salt content of the swatches is calculated from this data.

(5) The remaining swatches are individually weighed and their weights recorded.

(6) Various percentages of detergent are dissolved into sufficient solvent to make 1600 ml. of solution. Sufficient water is then added to produce a 75% solvent-relative humidity.

(7) Four hundred ml. of the above solution is put into each Terg-O-Tometer beaker.

(8) Two swatches are placed in the solution in each beaker and the Terg-O-Tometer operated for 30 minutes at 75 cycles per minute and 75° F.

(9) The Terg-O-Tometer is stopped, the swatches are removed, drained, and permitted to dry by suspending them from a line in a hood.

(10) Each air dried swatch is placed in a 250 ml. Erlenmeyer flask and its salt content determined as in Step (4).

(11) The percent salt removal is calculated from the data.

Carbon soil removal (1) A given percent detergent was added to the solvent and the proper solvent-relative humidity obtained by adding water.

(2) Add 400 mls. of the above solution to each of the Terg-O-Tometer beakers.

(3) Add two 4-inch by 4-inch Foster D. Snell standard soiled wool swatches to each beaker.

(4) Run Terg-O-Tometer for 20 minutes at 75 cycles per minute and 75° C.

TABLE I.—WATER TOLERANCE OF DRY CLEANING COMPOSITIONS

| Test No. | Solvent | Detergent | Relative humidity (percent), as a function of water content | | | | | | | | |
|---|---|---|---|---|---|---|---|---|---|---|---|
| | | | 0.1% $H_2O$ | 0.2 | 0.3 | 0.4 | 0.5 | 0.6 | 0.7 | 0.8 | 0.9 |
| 1 | $C_2Cl_4$ | Petroleum sulfonate [1] | 66 | 75 | 84 | | | | | | |
| 2 | $C_2Cl_4$ | Fatty amine condensate [1] | 57 | 66 | 72 | 80 | 82 | | | | |
| 3 | $C_2Cl_4$ | Pentadecyldichlorodiphenyl oxide $SO_3Na$. | 58 | | | 71 | | 79 | 88 | | |
| 4 | $C_2Cl_4$ | 4-dodecyl-4'-chlorodiphenyl oxide $SO_3Na$. | 32 | 48 | 58 | 65 | 73 | 75 | 79 | 88 | |
| 5 | Varsol [2] | Pentadecyldichlorodiphenyl oxide $SO_3Na$. | 44 | 51 | 55 | 59 | 63 | 66 | 70 | 74 | 79 |

[1] Commercial detergents widely used in the dry cleaning industry.
[2] Commercial solvent widely used in the dry cleaning industry.

Representative compounds of the invention were further evaluated as dry cleaning detergents by determining their detergent properties in this application. Dry clean- (5) Remove swatches, drain and suspend on a line in a hood until dry.

(6) The search unit of a Model 610, Photovolt Reflectometer is placed over an unsoiled swatch supplied by vendor and the galvanometer needle set on 100.

(7) The search unit is placed on an unwashed soiled swatch and the galvanometer needle adjusted to zero.

(8) Measure the reflectance of the washed swatch. The galvanometer now reads directly in percent soil removal.

*Whiteness retention*

(1) Disperse a given weight of either carbon black or fine floor sweepings in the solvent-detergent-water solution.

(2) The percent detergent used was varied from 1.25 to 2.5%.

(3) Four hundred mls. of solution was added to each of the Terg-O-Tometer beakers.

(4) Place two 6-inch by 6-inch swatches of unsoiled white rayon in each beaker.

(5) Agitate for 10 minutes.

(6) Remove swatches, drain, and suspend from a line in a hood until dry.

(7) Measure the reflectance of the soiled fabric.

(8) Make similar tests with no detergent added.

(9) Calculate whiteness retention using the formula $$\frac{\text{Reflectance after soiling}}{\text{Reflectance unwashed fabric}} \times 100 = \frac{\text{Percent whiteness}}{\text{retention}}$$

In the following tests, perchloroethylene, the most widely used dry cleaning solvent, was used. The concentration of the detergent in this solvent is expressed as percent by weight. Similar results are obtained when other commercial dry cleaning solvents are used instead of perchloroethylene.

TABLE II

| Test No. | Detergent | Conc. of detergent, percent | Percent removal | | Whiteness retention, percent |
|---|---|---|---|---|---|
| | | | Sol. soil | Insol. soil | |
| 1 | Bis-(2-hydroxyethyl)- ammonium dodec- ylchlorodiphenyl oxide sulfonate. | 1.25<br>2.50 | 47<br>67 | 30<br>26 | 63<br>68 |
| 2 | 2-hydroxyethylam- monium dodecyl- chlorodiphenyl ox- ide sulfonate. | 2.50 | 61 | 22 | (¹) |
| 3 | Triethylammonium dodecylchlorodi- phenyl oxide sulfo- nate. | 1.25 | 39 | 27 | 69 |
| 4 | Bis-(2-hydroxyethyl) ammonium dodec- yldichlorodiphenyl oxide sulfonate. | 1.25 | 53 | 6 | 35 |
| 5 | Sodium dodecylchlo- rodiphenyl oxide sulfonate. | 2.50 | 47.4 | 63.5 | 79.2 |

¹ Not measured.

Many of the new compounds, especially the monohalo disulfonates are useful in surface active compositions used in cellulose chemical pulp production as described in Canadian Patent No. 381,129 because they are soluble in 5 to 8% caustic and insoluble in 17 to 22% caustic (mercerizing or steeping strength). The compounds useful for this purpose include those having the formula

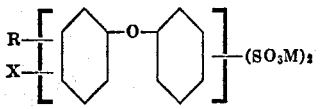

wherein R is an alkyl radical containing 12 to 15 carbon atoms; X is a halogen having an atomic number from 17 to 35, and M is an alkali metal.

The compounds of the invention have been tested and found to exert potent bacteriostatic and fungistatic effect on many common harmful bacteria and fungi. Moreover, it has been found that when many articles, especially fabrics, are washed in a solution containing the active alkylhalodiphenyl oxide sulfonate, a marked residual bacteriostatic and fungistatic effect is observed; i.e., not only is the growth of the microbes then on the washed object substantially inhibited but the inhibitory effect persists for days thereafter. While these effects are strongest when alkylhalodiphenyl oxide sulfonates are used as the sole detergent, it is also observed when they constitute only a small percentage of the active detergent, the major portion thereof being any conventional detergent having no unusual anti-microbial property.

In the formulation of commercial detergent products such as laundry or dish-washing detergent powders or detergent "soap" bars, whether or not they contain conventional soaps, the compounds of our invention may be used as the sole active detergent or they may be combined with one or more anionic or nonionic detergents. In addition, they may be combined with the known builders, extenders, anti-redeposition agents, brighteners, foam modifiers, and the like, each of which then performs its normal function. Thus, useful built detergent compositions are obtained by combining a detergent builder with a compound having the formula

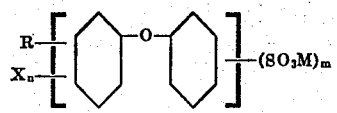

wherein R is an alkyl radical containing 12 to 22 carbon atoms, X is a halogen having an atomic number from 17 to 35, m and n are integers from 1 to 2 and M is a water-solubilizing monovalent cation, preferably an alkali metal or hydroxyalkylammonium radical. The following examples are typical illustrations of the above applications.

EXAMPLE 8

A laundering bath comprising 1 gram per liter of sodium tripolyphosphate, 0.01 gram per liter of carboxymethyl cellulose and 0.4 gram per liter of sodium dodecylchlorodiphenyl oxide sulfonate prepared as described in Example 3 was employed to wash samples of artificially soiled fabric in a U.S. Testing Company Terg-O-Tometer and the washed cloths compared for whiteness measured in reflectance units on a reflectometer. A control of unwashed fabric was also measured. The results of such tests are recorded in the table below:

TABLE III

| Surfactant | Reflectance of artificially soiled cotton cloth | |
|---|---|---|
| | ACH ¹ 130 | ACH ¹ 180 |
| Dodecylmonochlorodiphenyl oxide mono- sodium sulfonate | 49.5 | 44.8 |
| Alkylbenzene sulfonate | 48.7 | 44.5 |
| Unwashed | 22.0 | 27.0 |

¹ Types of artificially soiled cotton cloth manufactured by American Conditioning House.

EXAMPLE 9

5 ml. of a 24-hour culture of *Micrococcus pyogenes* var. *aureus* (Strain ATCC 209), also known as *Staphylococcus aureus*, in peptone broth was mixed with 50 ml. of a molten nutrient agar at 50° C. 5 ml. of this mixture was pipetted onto the surface of Petri dishes containing solidified nutrient agar and the Petri dishes were set aside to let the agar harden. Fabrics washed with detergent composition and dried were then placed on top of the agar in the seeded Petri dishes. The plates were incubated for 24 hour at 37° C. The fabric was thereafter removed from the agar surface and the latter examined for evidence of growth of bacteria. The area covered by the cloth washed with sodium dodecylchlorodiphenyl oxide sulfonate as well as an area around the perimeter of the cloth of ½ millimeter width was found to be substantially free from the growth of the bacterial organism. The areas under the cloth washed with dodecylbenzene sulfonate or sodium lauryl sulfate showed the growth of numerous colonies of the bacterial organism.

In tests similar to that above, fabrics that had been dry cleaned as described above under the Soil Removal Tests were tested for residual antimicrobial activity. Results are summarized in Table IV.

TABLE IV

| Detergent | Fabric | Bacterial growth under sample | Zone of inhibition, mm. |
|---|---|---|---|
| Na dodecylchlorodiphenyl oxide sulfonate. | Rayon | None | 1.0–1.5 |
|  | Wool | do | 1.0–1.5 |
| Diethanolammonium dodecylchlorodiphenyl oxide sulfonate. | Rayon | None | 1.5–2.0 |
|  | Wool | do | 1.2–2.5 |
| None | Rayon | Moderate | None |
|  | Wool | Heavy | None |

It has been noted that the residual bacteriostatic and fungistatic properties of articles washed or otherwise contacted with the compounds of the invention is considerably enhanced if polyvalent metal ions are present. This is thought to be due to the precipitation on the treated article of the insoluble or difficulty soluble polyvalent metal salt of the alkylhalodiphenyl oxide sulfonic acid. Ordinary domestic water supplies contain sufficient hardnes to produce this effect although additional soluble salts, such as calcium or magnesium chloride, sulfate, carbonate or the like may be added to the treating solution if desired. Among the salts that have been found especially effective for this purpose are those of calcium, zinc, magnesium, copper, mercury and iron. Other suitable salts include those of aluminum, manganese, barium, lead, silver, cadmium, and, in general, any metal having a valence of up to three. Such salts of any of the alkylhalodiphenyl oxide sulfonic acids of the invention are apparently effective for the purpose.

In a series of antimicrobial tests of various compounds of this invention the compound to be tested was dissolved in sterile distilled water and portions of this solution were mixed into A.O.A.C. broth to produce concentrations therein of 0, 2.5, 5, 7.5, 10, 25 and 50 parts per million, by weight. Tubes of these broths were then inoculated with a 24-hour culture of *Staphylococcus aureus* and incubated at 37° C. for 48 hours. They were then read for growth or no growth. Some typical results of such tests are shown in Table V.

In Table V two numbers are shown under the heading "Inhibitory Concentration." The first is the highest tested concentration at which growth of the bacteria was observed while the second is the lowest tested concentration which prevented growth.

TABLE V.—INHIBITION OF GROWTH OF *STAPHYLOCOCCUS AUREUS*

| Compound: | Inhibitory concentration, p.p.m. |
|---|---|
| Na dodecylchlorodiphenyl oxide sulfonate | 2.5–5 |
| Zn dodecylchlorodiphenyl oxide sulfonate | 10–25 |
| Hg dodecylchlorodiphenyl oxide sulfonate | 2.5–5 |
| Li dodecylchlorodiphenyl oxide sulfonate | 2.5–5 |
| Cu dodecylchlorodiphenyl oxide sulfonate | 7.5–10 |
| Mg dodecylchlorodiphenyl oxide sulfonate | 2.5–5 |
| Ca dodecylchlorodiphenyl oxide sulfonate | 5–7.5 |
| N,N-bis(2-hydroxyethyl)ammonium dodecylchlorodiphenyl oxide sulfonate | 2.5–5 |
| Na dodecylchlorodiphenyl oxide disulfonate | 25–50 |
| Na dodecyldichlorodiphenyl oxide sulfonate | 2.5–5 |
| Na dodecylbromodiphenyl oxide sulfonate | 7.5–10 |
| Na dodecylbromodiphenyl oxide disulfonate | 25–50 |
| Na pentadecylchlorodiphenyl oxide disulfonate | 25–50 |
| Na pentadecylchlorodiphenyl oxide sulfonate | 25–50 |
| Na pentadecylbromodiphenyl oxide sulfonate | 25–50 |
| Na dodecyliododiphenyl oxide sulfonate | 25–50 |
| Na docosanylchlorodiphenyl oxide disulfonate | 50–100 |

In other tests similar to those reported in Table V, the ability of the compounds of the invention to inhibit the growth of other microorganisms was measured. The procedure was the same as that described above except that in the case of *Corynebacterium diphtheriae* the culture medium was a brain-heart infusion broth and the cultures of *Bacillus subtilis* and *Bacillus cereus* were incubated 10 days before being read.

Results of these tests are shown in the following table. Sodium dodecylchlorodiphenyl oxide sulfonate was the growth inhibitor in each of these experiments.

TABLE VI.—INHIBITION OF GROWTH OF VARIOUS MICROORGANISMS

| Organism: | Inhibitory concentration, p.p.m. |
|---|---|
| *Bacillus subtilis* | 10–25 |
| *Bacillus cereus* | 10–25 |
| *Corynebacterium diphtheriae* | 5–10 |
| *Micrococcus pyogenes* var. *aureus* #209 | 2.5–5 |
| *Micrococcus pyogenes* var. *aureus* 80/81 | 5–10 |
| *Micrococcus pyogenes* var. *albus* | 5–10 |
| *Micrococcus pyogenes* var. *aureus* Queens General Hospital | 5–10 |
| *Streptococcus viridans* | 10–25 |
| Hemolytic Streptococcus | 5–10 |

It has been found that the alkali metal salts and other pharmaceutically acceptable salts of the sulfonic acids of the invention are substantially non-irritating to animal tissues and non-toxic when used internally or externally, or even when injected, in antimicrobial concentrations. This makes them highly desirable as active components of household detergents, toilet soaps and detergent bars, shampoos, cosmetic creams, lotions, powders and the like, foot powders, body dusting powders, ointments, salves, pharmaceutical creams and injectable antibiotics. Some of these applications are illustrated by the following examples.

EXAMPLE 10

A typical laundry detergent having antimicrobial properties:

| | Parts |
|---|---|
| Sodium dodecylchlorodiphenyl oxide sulfonate | 20 |
| Sodium tripolyphosphate | 50 |
| Sodium carboxymethyl cellulose | 0.5 |

The above composition is highly effective at a concentration of 0.10 to .15% in hard or soft water. It not only cleans fabrics but imparts antimicrobial properties thereto.

While the water-soluble salts of the invention are effective surfactants in themselves, they are also effective when combined with other anionic or nonionic detergents. This compatibility is especially useful in the formulation of detergent bars for hand and bath use. A typical such bar having outstanding detergent and antimicrobial properties is described in the following example.

EXAMPLE 11

2400 grams (20.2% by weight) of sodium dodecylchlorodiphenyl oxide sulfonate, 5065 grams (61.7%) of the coconut acid ester of sodium isethionate (Igepon AC 78, a commercial product), 640 grams (7.7%) of zinc stearate and 80 grams (.9%) of titanium dioxide were mixed together and passed twice through a 3-roll mill to obtain a smooth ribbon. The ribbon was then passed through a soap plodder several times to insure uniform mixing and then plodded into a long rod which was then cut and pressed into bars about 1 inch thick and 3 inches square. The bar was then employed in the treatment of fungus diseases such as athlete's foot (*Tinea pedis*) by washing the affected area with the bar twice daily for a period of 3 weeks. At the end of this period, marked relief of the fungus growth was observed as evidenced by healing of the scale and raw area of the affected portions. A control was run employing a composition substantially identical with the above except that no diphenyl oxide derivative was present. Washing the affected area with the control for a period of 3 weeks resulted in no improvement or relief.

EXAMPLE 12

750 grams (22.8%) of sodium dodecylchlorodiphenyl oxide sulfonate, 2250 grams (68.2%) of Ivory Soap Flakes, and 300 grams (9.0%) of water were milled, ploded and pressed into bars in the manner of Example 11. This soap was excellent as a hand or bath soap, having a desirable hardness, feel and rate of dissolving. It produced abundant lather having excellent cleaning.

The bars were employed to treat athlete's foot by washing the affected area. Within 3 weeks relief of rawness and itching was evidenced. Controls wherein the affected areas were similarly washed with a bar of Ivory soap showed no relief.

The compounds of the invention, when used in soaps, ointments, dusting powders or lotions, have shown a beneficial soothing effect and reduction or elimination of itching or irritation in various other skin disorders, such as diaper rash and dandruff and on flea bites and fungus infections on dogs.

The symbol M is used herein to represent a cation. It is to be understood that wherever M is used, the cation is present in sufficient quantity to satisfy the valence of the sulfonate radical with which it is associated. Thus, in the radical —$SO_3M$, it is to be understood that M represents 1 molar proportion of a mono-valent cation, ½ molar proportion of a divalent cation or ⅓ molar proportion of a trivalent cation.

We claim:

1. A germicidal detergent composition comprising a detergent builder in an amount effective to improve the detergent properties of the composition and a compound corresponding to the formula

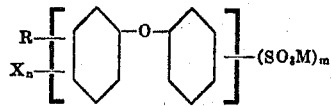

wherein R is an alkyl radical containing 12 to 22 carbon atoms; X is a halogen having an atomic number form 17 to 35; $m$ and $n$ are integers from 1 to 2 and, M represents a water-solubilizing monovalent cation.

2. A germicidal detergent composition as defined in claim 1 wherein M is an alkali metal.

3. A germicidal detergent composition as defined in claim 1 wherein M is a hydroxyalkylammonium radical.

4. A germicidal detergent composition as defined in claim 1 wherein the detergent builder is sodium tripolyphosphate.

5. A germicidal detergent composition consisting essentialy of (A) as the active detergent, one part by weight of sodium dodecylmonochlorodihpenyl oxide monosulfonate and (B) as a builder, about 2.5 parts of sodium tripolyphosphate.

6. A composition consisting of an aqueous solution of about 5 to 8%, by weight, of sodium hydroxide and 0.1 to 5% of a compound having the formula

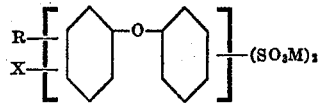

wherein R is an alkyl radical containing 12 to 15 carbon atoms, X is a halogen having an atomic number of 17 to 35 and M is an alkali metal.

References Cited by the Examiner
UNITED STATES PATENTS

| | | | |
|---|---|---|---|
| 2,081,876 | 5/1937 | Prahl | 252—353 XR |
| 2,338,689 | 1/1944 | Parker et al. | 252—142 XR |
| 2,427,576 | 9/1947 | Smith | 252—353 XR |
| 2,548,019 | 4/1951 | Hedrick | 252—353 XR |
| 2,854,477 | 9/1958 | Steinhauer | 252—353 XR |
| 2,990,375 | 6/1961 | Steinhauer | 252—138 |
| 2,992,999 | 7/1961 | Smith | 252—161 |

JULIUS GREENWALD, *Primary Examiner.*

A. T. MEYERS, *Assistant Examiner.*